(12) United States Patent
Lin et al.

(10) Patent No.: US 11,372,458 B2
(45) Date of Patent: Jun. 28, 2022

(54) STRUCTURE OF CASE ASSEMBLY

(71) Applicant: ADLINK TECHNOLOGY INC., New Taipei (TW)

(72) Inventors: Yung-Fu Lin, New Taipei (TW); Yung-Jui Chao, New Taipei (TW)

(73) Assignee: ADLINK TECHNOLOGY INC., New Taipei (TW)

( * ) Notice: Subject to any disclaimer, the term of this patent is extended or adjusted under 35 U.S.C. 154(b) by 294 days.

(21) Appl. No.: 16/816,825

(22) Filed: Mar. 12, 2020

(65) Prior Publication Data

US 2021/0286414 A1    Sep. 16, 2021

(51) Int. Cl.
*G06F 1/18*    (2006.01)

(52) U.S. Cl.
CPC .............. *G06F 1/181* (2013.01); *G06F 1/183* (2013.01)

(58) Field of Classification Search
CPC .... H01R 13/46; H01R 13/502; H01R 13/516; H01R 13/518; H01R 13/501; H01R 13/506; H01R 13/508; H01R 13/512; G06F 1/181; G06F 1/183
USPC .............................. 439/467, 596, 620.22, 926
See application file for complete search history.

(56) References Cited

U.S. PATENT DOCUMENTS

| | | | | |
|---|---|---|---|---|
| 5,006,959 A * | 4/1991 | Freige | ...................... | G06F 1/186 361/679.48 |
| 5,051,868 A * | 9/1991 | Leverault | ................. | G06F 1/182 361/740 |
| 5,401,193 A * | 3/1995 | Lo Cicero | ............ | H01R 13/518 439/713 |
| 6,157,540 A * | 12/2000 | Eddings | .................... | H05K 7/16 361/752 |
| 6,407,910 B1 * | 6/2002 | Diaz | ........................ | G06F 1/187 |
| 6,511,328 B2 * | 1/2003 | Molus | .................... | H02G 3/088 439/502 |
| 7,468,889 B2 * | 12/2008 | Su | .......................... | H05K 7/142 361/720 |
| 7,733,659 B2 * | 6/2010 | Snider | ...................... | H04R 1/02 361/752 |
| 8,348,694 B2 * | 1/2013 | Kah | ....................... | H01R 12/724 439/926 |
| 8,926,358 B2 * | 1/2015 | Kuo | .................... | H01R 13/6395 439/367 |
| 9,466,933 B1 * | 10/2016 | Wang | ................... | H01R 25/006 |

(Continued)

FOREIGN PATENT DOCUMENTS

EP    2362551 A2 *    8/2011    ........... B21D 26/027

*Primary Examiner* — Marcus E Harcum
(74) *Attorney, Agent, or Firm* — Muncy, Geissler, Olds & Lowe, P.C.

(57) ABSTRACT

A case assembly includes a case body including a bottom panel, two side panels, a back panel higher than the side panels, a mounting structure located on the side panels, a first circuit board mounted on the bottom panel and a second circuit board mounted on the back panel and electrically connected to the first circuit board, and a cover including a top cover panel for covering the top open side of the case body, a front cover panel pivotally connected to the top cover panel for covering the front side of the case body and a positioning structure located on the bottom side of the top cover panel for detachably fastened to the mounting structure of the case body through a sliding action facilitating repair or replacement of the first circuit board or the second circuit board.

8 Claims, 4 Drawing Sheets

(56) References Cited

U.S. PATENT DOCUMENTS

| | | | |
|---|---|---|---|
| 9,958,909 B1* | 5/2018 | Sporer | G06F 1/181 |
| 10,085,365 B2* | 9/2018 | Yu | H05K 7/20545 |
| 10,420,236 B1* | 9/2019 | Hsu | H01R 13/5213 |
| 2006/0126274 A1* | 6/2006 | Iwano | H04B 1/082 |
| | | | 361/600 |
| 2007/0067119 A1* | 3/2007 | Loewen | G01R 22/065 |
| | | | 702/57 |
| 2008/0310095 A1* | 12/2008 | Chiang | H05K 7/023 |
| | | | 361/725 |
| 2010/0188834 A1* | 7/2010 | Snider | G06F 11/00 |
| | | | 361/818 |
| 2010/0246155 A1* | 9/2010 | Snider | H04B 15/02 |
| | | | 156/212 |
| 2011/0230076 A1* | 9/2011 | Lim | H01R 43/26 |
| | | | 439/345 |
| 2013/0294039 A1* | 11/2013 | Chao | G06F 1/182 |
| | | | 361/752 |
| 2014/0362576 A1* | 12/2014 | Degner | G02B 6/0001 |
| | | | 362/253 |
| 2015/0382494 A1* | 12/2015 | Hu | G06F 1/187 |
| | | | 248/314 |
| 2016/0270270 A1* | 9/2016 | Madsen | G06F 1/181 |
| 2018/0254620 A1* | 9/2018 | Kosuga | H01R 13/5219 |
| 2019/0286197 A1* | 9/2019 | Khan | G06F 1/20 |
| 2021/0195783 A1* | 6/2021 | Best | H05K 7/1418 |

* cited by examiner

STRUCTURE OF CASE ASSEMBLY

BACKGROUND OF THE INVENTION

1. Field of the Invention

The present invention relates to computer case technology and more particularly, to a case assembly, which comprises a case body holding therein a first circuit board and a second circuit board, and a cover having a top cover panel detachably fastened to the top side of the case body to cover the top side of the case body and a front cover panel for covering the front side of the case body, When the user wants to repair or replace the first circuit board or the second circuit board, the user simply needs to turn the front cover panel upwards and then to pull the top cover panel away from the case body, thereby achieving the effect of reducing disassembly time and downtime.

2. Description of the Related Art

The electronic technology today is growing at a fast pace, so that computer equipment such as computers and notebook computers have been ubiquitous in all corners of the society, and are moving in the direction of strong computing functions, fast speed and small size. However, with the open architecture of computer equipment and the standardization of software and hardware, coupled with the continuous expansion and upgrade of functions, manufacturers have developed industrial computers suitable for various professional fields, mainly used in industrial control, industrial automation, networking, communication equipment, machine vision, intelligent transportation systems, etc., also suitable for military, transportation and aerospace fields that require important tasks, such as industrial applications that require high reliability and stability, to meet customer-specific specifications and requirements for performing high-performance operations in harsh environments.

Furthermore, the case of a general industrial computer comprises a case body and a back panel, wherein a circuit board is installed inside the case body and another circuit board is installed on the back panel, and the two circuit boards are electrically connected to each other by using mating electrical connectors for electrical signal transmission. However, base on anti-theft considerations, the appearance of the case needs to be designed without screws, so the case body and the back panel are assembled into a single body by using multiple pull studs. However, the use of multiple pull studs to assemble the case body and the back panel into one body is not only troublesome during assembly. If the circuit board is damaged and needs to be repaired or replaced, the pull studs must be destroyed before the case body and the back panel can be separated for the repairment or replacement of the damaged circuit board. Therefore, assembling the case body and the back panel through multiple pull studs will make the assembly and maintenance process too complicated and inconvenient.

Therefore, how to solve the above-mentioned problems and shortcomings is the direction that the relevant manufacturers engaged in this industry want to study and improve.

SUMMARY OF THE INVENTION

The present invention has been accomplished under the circumstances in view. It is therefore one object of the present invention to provide a case assembly, which a case body and a cover. The case body comprises an accommodation chamber defined therein, an opening formed on each of a top side and a front side of the accommodation chamber, a bottom panel provided at a bottom side of the accommodation chamber, two side panels respectively provided at opposing left and right sides of the accommodation chamber, a back panel provided at a rear side of the accommodation chamber, a mounting structure located on the side panels, a first circuit board mounted on the bottom panel within the accommodation chamber, a first connection unit mounted on the first circuit board near a rear side thereof, a second circuit board mounted on the back panel and electrically connected to the first circuit board, and a second connection unit mounted on a front side of the second circuit board and suspending in the accommodation chamber for the connection of the first connection unit electrically. The cover comprises a top cover panel for covering the opening formed on the top side of the accommodation chamber, and a front cover panel pivotally connected to the top cover panel for covering the opening formed on the front side of the accommodation chamber. The top cover panel comprises a positioning structure located at a bottom side thereof for fastening to the mounting structure, and a pivot connection portion located at a front side thereof. The front cover panel comprises a pivot connection portion pivotally connected to the pivot connection portion of the top cover panel. When the top cover panel of the cover is covered over the opening above the accommodation chamber of the case body, the front cover panel can be biased relative to the top cover panel to cover the opening in front of the accommodation chamber, thereby shielding the first circuit board. When the user wants to repair or replace the first circuit board or the second circuit board, the user simply needs to lift the front cover panel and then separate the top cover panel from the case body, at this time, the user can repair or replace the first circuit board and/or the second circuit board directly, thereby achieving the effect of reducing disassembly time and downtime.

It is another object of the present invention to provide a case assembly, which is so configured that the user can insert pivot screws through respective perforations on the top cover panel and fasten the pivot screws to respective fastening holes on the side panels, and then turn the front cover panel of the cover downwards to shield the opening in front of the accommodation chamber and to keep the pivot screws from sight, and then insert the key into a locking device in the front cover panel to lock the locking device in a positioning hole on the bottom panel, so that the overall appearance can be exposed without any screws. The locking device can only be unlocked from the positioning hole by inserting the key into the locking device and then rotating the key from the locking position to the unlocking position, thereby achieving a good anti-theft effect.

It is still another object of the present invention to provide a case assembly, which has a shield provided at the top side of the case body to shield the second circuit board, preventing the electrical connectors of the second circuit board from being damaged by evil persons and also reducing the accumulation of dust. Furthermore, after inserting positioning legs of the shield downwardly into respective notches on the side panels and the rear side of the top cover panel of the cover into plugging spaces defined between the positioning legs and the bottom side of the shield, the shield is firmly secured to the case body and the cove. Thus, the shield can be assembled on the case body and the cover quickly without screws, rivets or other fastening members, achieving the effect of good assembly convenience.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
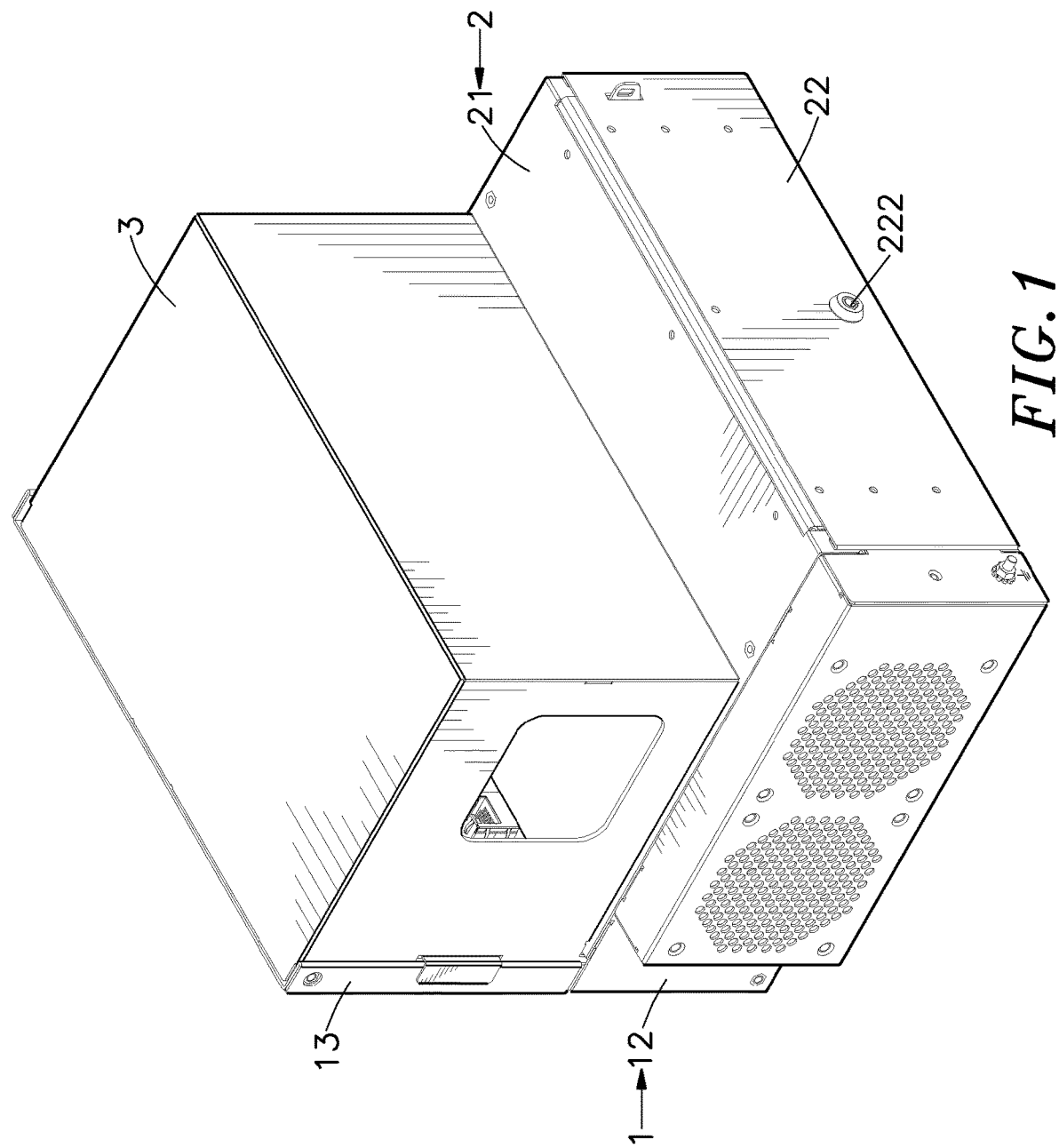
FIG. 1 is an oblique top elevational view of a case assembly in accordance with the present invention.
Figure 2:
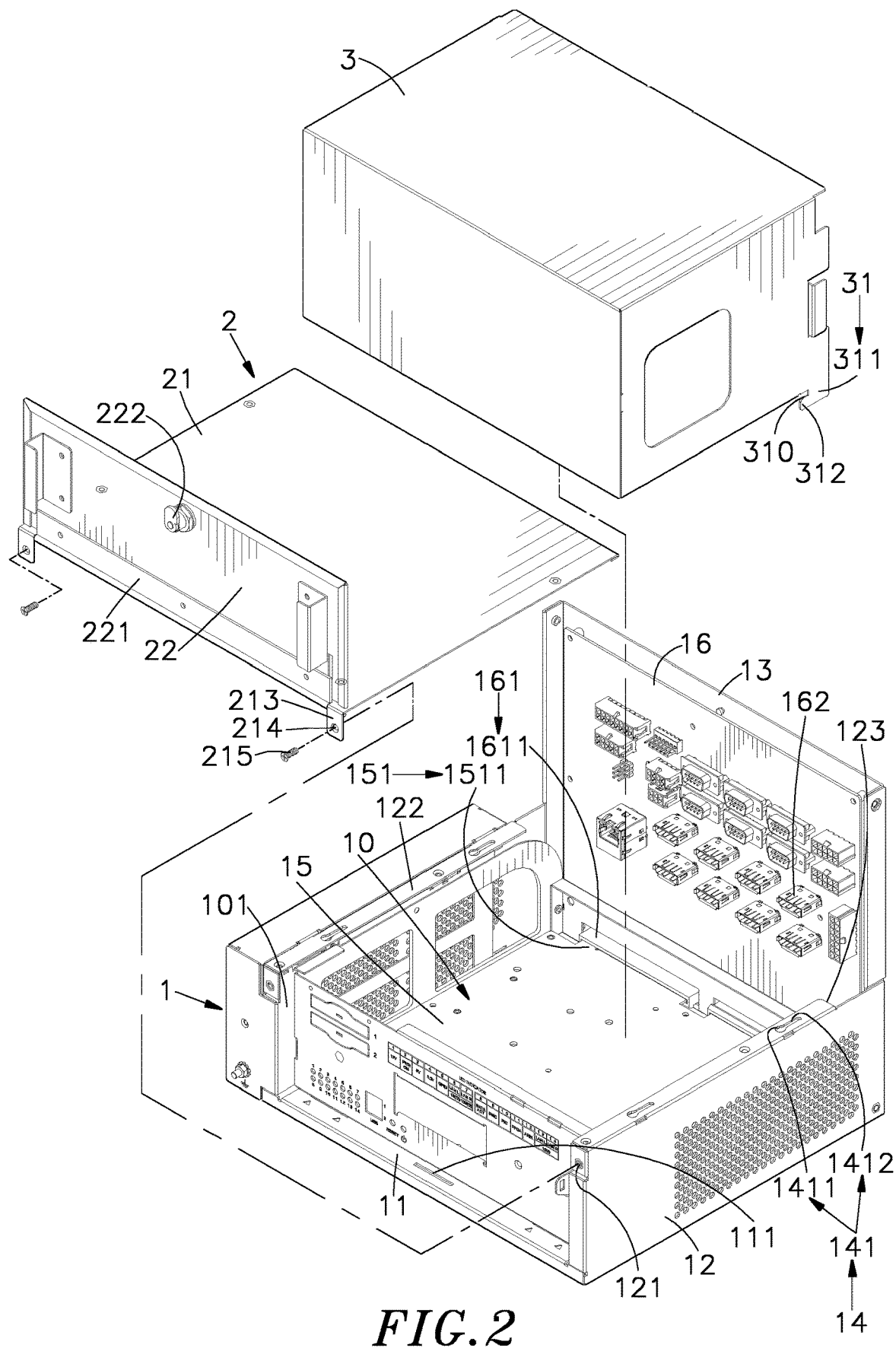
FIG. 2 is an exploded view of the case assembly in accordance with the present invention.
Figure 3:
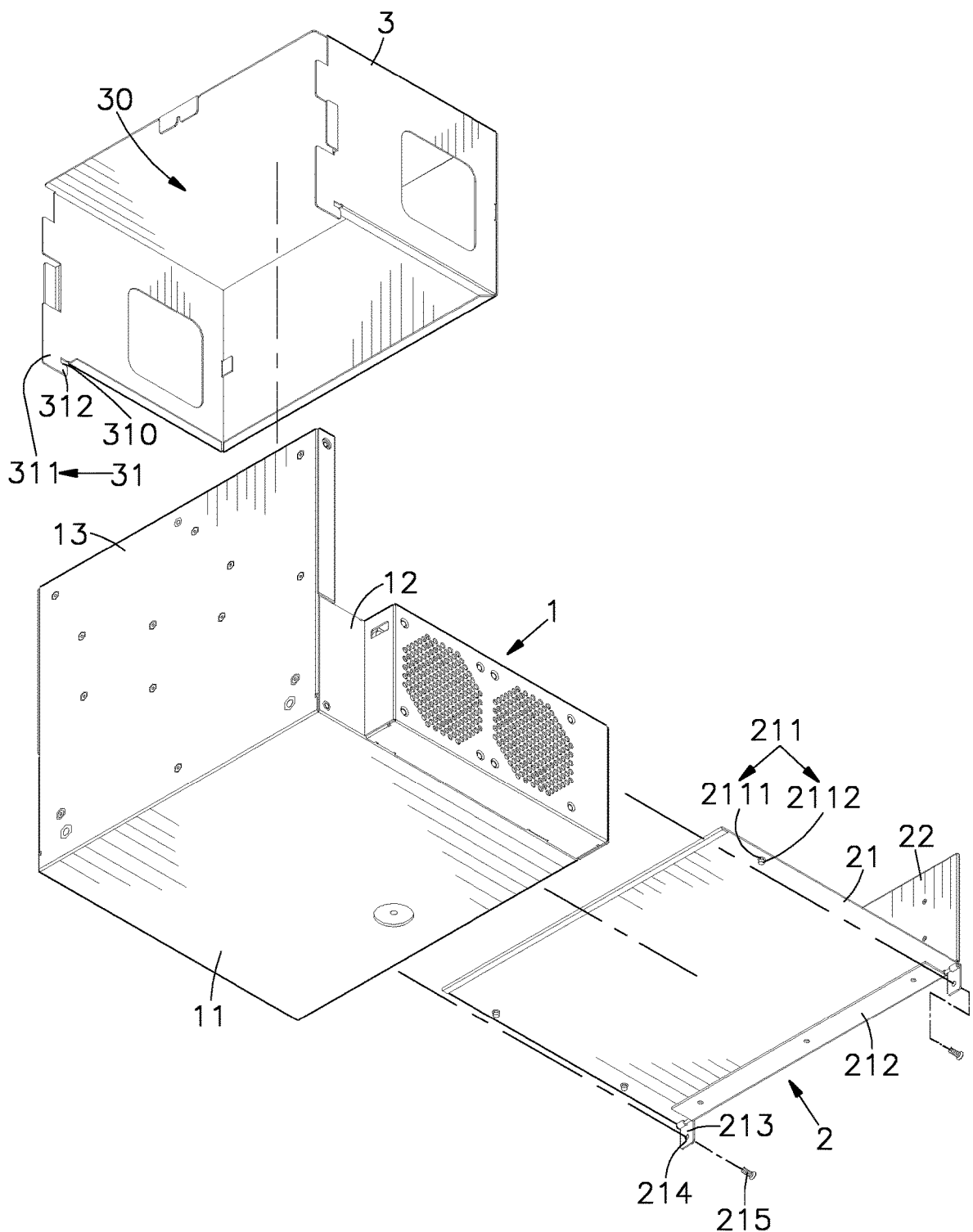
FIG. 3 corresponds to FIG. 2 when viewed from another angle.
Figure 4:
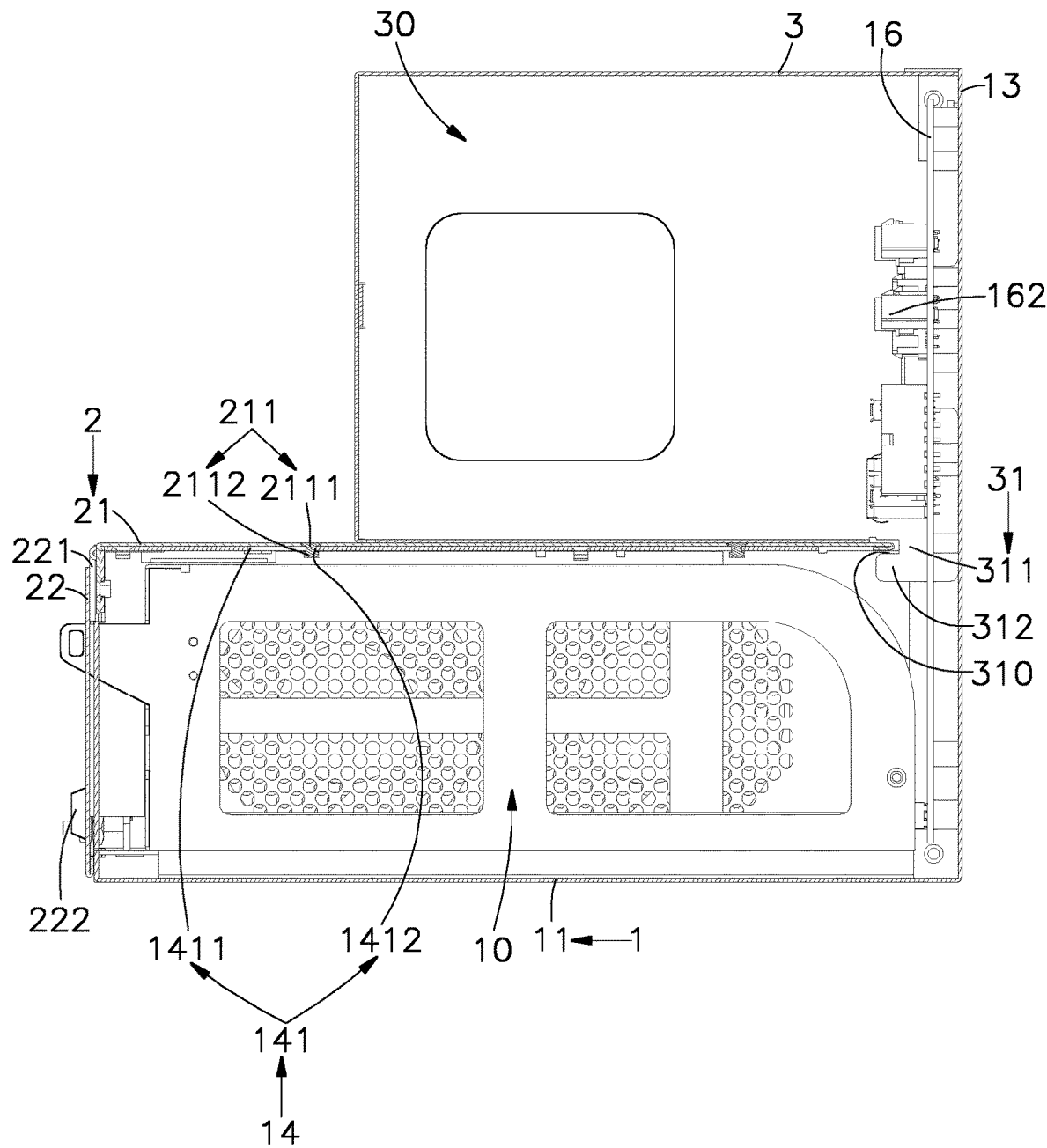
FIG. 4 is a sectional side view of the case assembly in accordance with the present invention.

Please refer to FIGS. 1-4, in which FIG. 1 is an oblique top elevational view of a case assembly in accordance with the present invention, FIG. 2 is an exploded view of the case assembly, FIG. 3 corresponds to FIG. 2 when viewed from another angle, and FIG. 4 is a sectional side view of the case assembly in accordance with the present invention. As illustrated, the case assembly comprises a case body 1, a cover 2 and a shield 3.

The case body 1 comprises an accommodation chamber 10, an opening 101 formed above and in front of the accommodation chamber 10, a bottom panel 11 provided at a bottom side of the accommodation chamber 10 and having a positioning hole 111 located thereon at a bottom side of the opening 101 in front of the accommodation chamber 10, two side panels 12 respectively provided at opposing left and right sides of the accommodation chamber 10, each side panel 12 having a fastening hole 121 located on a front side thereof, a mounting flange 122 perpendicularly inwardly extended from a top side thereof and a notch 123 located at a rear side of the mounting flange 122, a back panel 13 provided at a rear side of the accommodation chamber 10 and having a height higher than the side panels 12, a mounting structure 14 located on the side panels 12, a first circuit board 15 mounted on the bottom panel 11 within the accommodation chamber 10, a first connection unit 151 mounted on the first circuit board 15 near a rear side thereof and provided with a plurality of electric plug 1511, a second circuit board 16 mounted on the back panel 13 and electrically connected to the first circuit board 15, a second connection unit 161 mounted on a front side of the second circuit board 16 and suspending in the accommodation chamber 10 and provided with a plurality of electric sockets 1611 for the connection of the electric plugs 1511 of the first connection unit 151 respectively and electrically, and a plurality of electrical connectors 162 mounted on the second circuit board 16 above the second connection unit 161. The mounting structure 14 comprises a plurality of sliding holes 141 symmetrically located on the mounting flanges 122 of the two side panels 12. Each sliding hole 141 comprises a hole 1411, and a slit 1412 extended from one side of the hole 1411.

The cover 2 comprises a top cover panel 21, and a front cover panel 22 pivotally connected to the top cover panel 21. The top cover panel 21 comprises a positioning structure 211 located at a bottom side thereof, a pivot connection portion 212 located at a front side thereof, two angled lugs 213 bilaterally extended from a front side thereof, a perforation 214 located on each angled lug 213, and a pivot screw 215 mounted in each perforation 214. The positioning structure 211 comprises a plurality of headed positioning pins 2111 respectively extended from a bottom surface of the top cover panel 21 at two opposite lateral sides and arranged in two rows. Each headed positioning pin 2111 has a bottom end thereof terminated into a large outer diameter positioning head 2112. The front cover panel 22 comprises a pivot connection portion 221 located at one side thereof and pivotally connected to the pivot connection portion 212 of the top cover panel 21, and a locking device 222 mounted therein at a selected.

The shield 3 has a storage space 30 defined therein, and is provided with two positioning legs 31 that are bilaterally disposed at a bottom side of the shield 3. Each positioning leg 31 comprises a base portion 311 located at the bottom side of the shield 3, and a hook portion 312 extended from the base portion 311 and defining with the bottom side of the shield 3 a plugging space 310 therebetween.

Furthermore, the first connection unit 151 of the first circuit board 15 and the second connection unit 161 of the second circuit board 16 in the case body 1 are configured according to PCI (Peripheral Component Interconnect) Express standard, referred to as PCI-E or PCIe standard.

When the present invention is actually assembled, the shield 3 is firstly assembled on the case body 1 by inserting the positioning legs 31 of the shield 3 into the respective notches 123 of the side panel 12, so that the shield 3 is located above the case body 1 to shield the second circuit board 16. Then, the cover 2 is assembled on the case body 1 by: moving the top cover panel 21 of the cover 2 along the top side of the two side panels 12 of the case body 1 to force the headed positioning pins 2111 of the positioning structure 211 into the holes 1411 of the respective sliding holes 141 of the mounting structure 14 and then continuously pushing the top cover panel 21 of the cover 2 toward the back panel 13 to force the headed positioning pins 2111 of the positioning structure 211 into the slits 1412 of the respective sliding holes 141 to the extent where the positioning heads 2112 of the headed positioning pins 2111 are positively stopped at the bottom side of the mounting flanges 122 of the two side panels 12 around the slits 1412. At this time, the top cover panel 21 blocks the opening 101 at the top side of the accommodation chamber 10, the rear side of the top cover panel 21 is positively engaged in the plugging spaces 310 between the positioning legs 31 and the bottom side of the shield 3, and the two angled lugs 213 of the top cover panel 21 are stopped at the front side of the side panels 12 with the perforations 214 of the angled lugs 213 respectively aimed at the fastening holes 121 of the side panels 12. Thus, the pivot screws 215 in the respective perforations 214 can then be fastened to the respective fastening holes 121, and then, the front cover panel 22 of the cover 2 can be biased downwards to turn the pivot connection portion 221 of the front cover panel 22 about the axis of the pivot connection portion 212 of the top cover panel 21, enabling the front cover panel 22 to block the opening 101 in front of the accommodation chamber 10. In this way, the front cover panel 22 shields the pivot screws 215, and the key (not shown) can be inserted into the locking device 222 of the front cover panel 22 and then rotated to the locking position to lock the locking device 222 in the positioning hole 111, so that the overall appearance can be exposed without any screws. The locking device 222 can be unlocked from the positioning hole 111 by inserting the key into the locking device 222 and then rotating the key from the locking position to the unlocking position, thereby achieving a good anti-theft effect.

When the user wants to repair or replace the first circuit board 15 or the second circuit board 16 in the case body 1, the user can insert the key into the locking device 222 in the front cover panel 22 and then reverse the key to unlock the locking device 222 from the positioning hole 111, and then bias the front cover panel 22 upward to expose the pivot screws 215, and then unfasten the pivot screws 215 from the respective fastening holes 121 and remove the pivot screws 215 from the fastening holes 121 of the side panels 12 and the perforations 214 on the angled lugs 213. Thereafter, pull the cover 2 to disengage the top cover panel 21 from the plugging spaces 310 between the positioning legs 31 and the bottom side of the shield 3 and to move the headed positioning pins 2111 of the positioning structure 211 from the slits 1412 of the respective sliding holes 141 into the holes 1411 of the respective sliding holes 141, allowing lifting of the cover 2 to move the headed positioning pins 2111 away from the respective sliding holes 141, and thus, the cover 2 can be separated from the case body 1. After removal of the cover 2 from the case body 1, the shield 3 can be lifted upward, so that the positioning legs 31 of the shield 3 are separated from the notches 123 of the side panels 12. After removal of the shield 3 from the case body 1, the first circuit board 15 or second circuit board 16 in the case body 1 is exposed to the outside, so that the user can separate the electric plugs 1511 of the first connection unit 151 of the first circuit board 15 from the electric sockets 1611 of the second connection unit 161 of the second circuit board 16, and then take the first circuit board 15 or the second circuit board 16 out of the case body 1 for repair or replacement.

The present invention has the advantages as follows:

(1) The front cover panel 22 and top cover panel 21 of the cover 2 are pivotally connected to each other. When the top cover panel 21 of the cover 2 is covered over the opening 101 above the accommodation chamber 10 of the case body 1, the front cover panel 22 can be biased relative to the top cover panel 1 to cover the opening 101 in front of the accommodation chamber 10, thereby shielding the first circuit board 15. When the user wants to repair or replace the first circuit board 15 or the second circuit board 16, the user simply needs to lift the front cover panel 22 and then separate the top cover panel 21 from the case body 1, at this time, the user can repair or replace the first circuit board 15 and/or the second circuit board 16 directly, thereby achieving the effect of reducing disassembly time and downtime.

(2) The user can insert the pivot screws 215 through the respective perforations 214 of the top cover panel 21 and fasten them to the fastening holes 121 of the side panels 12, and then turn the front cover panel 22 of the cover 2 downwards to shield the opening 101 in front of the accommodation chamber 10 and to keep the pivot screws 215 from sight, and then insert the key into the locking device 222 in the front cover panel 22 to lock the locking device 222 in the positioning hole 111, so that the overall appearance can be exposed without any screws. The locking device 222 can only be unlocked from the positioning hole 111 by inserting the key into the locking device 222 and then rotating the key from the locking position to the unlocking position, thereby achieving a good anti-theft effect.

(3) The shield 3 is provided at the top side of the case body 1 to shield the second circuit board 16, preventing the electrical connectors 162 of the second circuit board 16 from being damaged by evil persons and also reducing the accumulation of dust. Furthermore, after inserting the positioning legs 31 of the shield 3 downwardly into the respective notches 123 of the side panels 12 and the rear side of the top cover panel 21 of the cover 2 into the plugging spaces 310 between the positioning legs 31 and the bottom side of the shield 3, the shield 3 is firmly secured to the case body 1 and the cover 2. Thus, the shield 3 can be assembled on the case body 1 and the cover 2 quickly without screws, rivets or other fastening members, achieving the effect of good assembly convenience.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A case assembly, comprising:
a case body comprising an accommodation chamber defined therein, an opening formed on each of a top side and a front side of said accommodation chamber, a bottom panel provided at a bottom side of said accommodation chamber, two side panels respectively provided at opposing left and right sides of said accommodation chamber, a back panel provided at a rear side of said accommodation chamber, a mounting structure located on each of said side panels, a first circuit board mounted on said bottom panel within said accommodation chamber, a first connection unit mounted on said first circuit board near a rear side thereof, a second circuit board mounted on said back panel and electrically connected to said first circuit board, and a second connection unit mounted on a front side of said second circuit board and suspending in said accommodation chamber for the connection of said first connection unit electrically; and
a cover comprising a top cover panel for covering the said opening formed on the top side of said accommodation chamber and a front cover panel pivotally connected to said top cover panel for covering the said opening formed on the front side of said accommodation chamber, said top cover panel comprising a positioning structure located at a bottom side thereof for fastening to said mounting structure and a pivot connection portion located at a front side thereof, said front cover panel comprising a pivot connection portion pivotally connected to the said pivot connection portion of said top cover panel.

2. The case assembly as claimed in claim 1, wherein said bottom panel of said case body comprises a positioning hole located at a bottom side of the said opening formed on the front side of said accommodation chamber, and said front cover panel of said cover comprises a locking device for locking in said positioning hole.

3. The case assembly as claimed in claim 1, wherein each said side panel of said case body comprises a fastening hole located on a front side thereof; said top cover panel of said cover further comprises two angled lugs bilaterally extended from a front side thereof, a perforation located on each said angled lug corresponding to one respective said fastening hole, and a pivot screw mounted in each said perforation for fastening to one respective said fastening hole.

4. The case assembly as claimed in claim 1, wherein each said side panel of said case body comprises a mounting flange perpendicularly inwardly extended from a top side thereof and a notch located at a rear side of said mounting flange; said case body is provided with a shield in a detachable manner, said shield comprising a storage space for receiving said second circuit board and two positioning legs bilaterally disposed at a bottom side thereof for engaging into said notches of said side panels respectively, each said positioning leg comprising a base portion located at the bottom side of said shield and a hook portion extended from said base portion and defining with the bottom side of said shield a plugging space therebetween for the insertion of the rear side of said top cover panel.

5. The case assembly as claimed in claim 1, wherein the height of said back panel of said case body is higher than the height of said side panels of said case body.

6. The case assembly as claimed in claim 1, wherein said mounting structure of said case body comprises a plurality of sliding holes symmetrically located on said side panels, each said sliding hole comprising a hole and a slit extended from one side of said hole; said positioning structure comprises a plurality of headed positioning pins respectively extended from a bottom surface of said top cover panel at two opposite lateral sides and arranged in two rows for engaging in said sliding holes of said mounting structure, each said headed positioning pin having a bottom end thereof terminated into a large outer diameter positioning head for stopping at a bottom side of said slit of one respective said sliding hole.

7. The case assembly as claimed in claim 1, wherein said first connection unit of said first circuit board comprises a plurality of electric plugs; said second connection unit of said second circuit board comprises a plurality of electric sockets respectively electrically connectable with said electric plugs.

8. The case assembly as claimed in claim 1, wherein said second connection unit of said second circuit board comprises a plurality of electrical connectors exposed outside said case body.

* * * * *